United States Patent [19]

Deck et al.

[11] Patent Number: 4,787,074
[45] Date of Patent: Nov. 22, 1988

[54] AUTOMATED LIBRARY FOR DATA STORAGE DISKS

[75] Inventors: Howard C. Deck, Henrietta; Warner P. Carlson; Lawrence W. Wirth, both of Rochester, all of N.Y.

[73] Assignee: Eastman Kodak Company, Rochester, N.Y.

[21] Appl. No.: 19,903

[22] Filed: Feb. 27, 1987

[51] Int. Cl.$^4$ .................... G11B 5/48; G11B 17/00
[52] U.S. Cl. ........................ 369/36; 369/195
[58] Field of Search ............ 369/38, 36, 39, 195

[56] References Cited

U.S. PATENT DOCUMENTS

| | | | |
|---|---|---|---|
| 1,399,110 | 12/1921 | Godfrey | 369/38 |
| 1,967,599 | 7/1934 | Thompsett et al. | 369/195 |
| 2,666,649 | 1/1954 | Vanderzee et al. | 369/195 |
| 4,286,790 | 9/1981 | Siryj et al. | 369/36 |
| 4,504,936 | 3/1985 | Faber et al. | 369/36 |
| 4,527,262 | 7/1985 | Manto | 369/38 |
| 4,608,679 | 8/1986 | Rudy et al. | 369/36 |
| 4,614,474 | 9/1986 | Sudo | 369/194 |
| 4,694,448 | 9/1987 | Tanaru et al. | 369/77.2 |

Primary Examiner—Steven L. Stephan
Attorney, Agent, or Firm—Warren W. Kurz

[57] ABSTRACT

Disclosed herein is an automated library for data storage disks. Such library comprises at least one disk drive, means for storing a large number of disks, and disk transport means for transporting disks between the disk drive and disk-storing means. The disk-transporting means comprises a bi-directional disk picker assembly which operates to convey selected disks into and out of the disk-storing means and disk drive. A movably mounted drive unit functions to rotatably support the disk picker assembly for movement about an axis which is perpendicular to the direction in which disks are conveyed by such assembly, whereby "picked" disks can be flipped 180 degrees to present either side to the disk drive. The picker assembly handles each disk by means of a carrier, a generally rectangular frame which surrounds and releasably captures a disk. The picker mechanism is adapted to handle such carrier in any one of four different orientations. A single DC servo motor functions to selectively drive each of two disk conveyors in the picker assembly, as well as to selectively rotate the picker assembly.

9 Claims, 8 Drawing Sheets

AUTOMATED LIBRARY FOR DATA STORAGE DISKS

BACKGROUND OF THE INVENTION

This invention relates to the field of data storage and retrieval. More particularly, it relates to improvements in apparatus of the type which is adapted to store a relatively large number of data storage disks (e.g., disks of the optical, magnetic and magneto-optic variety) and, on command, to transport a selected disk between a storage location and a disk utilization device, such as a disk drive.

Automated disk libraries, sometimes known as "jukeboxes", are known in the art for storing and utilizing a large number of data storage disks. Examples of such libraries are those disclosed in U.S. Pat. Nos. 4,286,790; 4,504,936; 4,608,679; and 4,614,474. In such libraries, each data storage disk is housed in a protective cartridge or carrier which surrounds the disk and facilitates disk-handling. The disk carriers are supported by one or more storage racks or the like which serve to arrange the carriers in closely spaced parallel planes, either side-by-side, or one above the other. Such systems comprise one or more disk drives for playing and/or recording information on the disks, and a disk carrier transport mechanism for transporting selected disks between their respective storage locations and the disk drive unit(s). The disk carriers are commonly provided with a pair of spaced notches or gripping slots on or near one edge so that the cartridges can be readily gripped and removed from their assigned storage positions or from their standby positions within a disk drive. In some systems, the disk carrier transport mechanism includes means for selectively rotating or flipping the disk carrier 180° so that either side of the data storage disk can be presented to the disk drive for recording and/or playback.

In data storage systems of the type disclosed in the aforementioned patents, each disk carrier must be inserted into the disk storage rack in a predetermined orientation so that its respective gripping slots are accessible to the transport mechanism. If the disk carrier orientation is altered, e.g., the carrier is turned end-for-end, it would be impossible for the carrier transport mechanism to grip the carrier for subsequent transport. While such systems are designed to avoid any such undesired change in disk carrier orientation, they do so at the expense of increasing the mean time to change disks. For example, a disk may have to be reoriented between the time it is removed from a disk drive and the time it is returned to storage.

SUMMARY OF THE INVENTION

In view of the foregoing, an object of this invention is to provide an improved automated library for data storage disks, one which is improved from the standpoint that it is capable of minimizing the mean time required to retrieve and store data storage disks.

Another object of this invention is to provide an improved disk carrier transport mechanism, one which is improved from the standpoint that it maintains more precise control over the disk carrier during its transport to and from storage.

Another object of this invention is to provide an improved drive unit for a disk transport mechanism of the type used in automated disk libraries.

According to one aspect of this invention, there is provided an automated disk library comprising (a) storage means for storing a plurality of data storage disk carriers in spaced parallel planes, (b) disk utilization means spaced from the carrier storage means, and (c) carrier transport mechanism, responsive to a carrier address command, for transporting a pre-selected carrier between the storage means and the disk utilization means. The carrier transport mechanism is mounted for movement along a vertical transport path as well as for 180° rotational movement about a horizontal axis which is perpendicular to the direction in which a disk carrier is extracted from the storage means. Means are provided for preventing relative movement between the carrier and the transport mechanism during such rotational movement of the transport mechanism.

According to a further aspect of this invention, a disk picker assembly is provided which is adapted for use with a particular type of disk carrier for extracting data storage disks from a storage location so that they may be transported to and from a utilization device. Such picker assembly comprises at least a first pair of endless conveyor belts, each having a plurality of teeth adapted to engage a rack of teeth on a disk carrier, means for adapting the conveyor belts along endless paths, and means for selectively adjusting the position of such paths so that the conveyor belt teeth engage, or disengage the opposing racks of teeth on a given disk carrier so as to selectively advance such disk carrier along a transport path defined by the conveyor belts.

According to a further aspect of this invention, a disk transport mechanism comprises two independently driven disk conveying mechanisms for advancing disk carriers to and from a storage location, means for rotating the disk transport about an axis so as to present either side of a disk to a disk utilization device, and a single DC servo motor for controlling the operation of the pair of conveying mechanisms and the rotational position of the transport mechanism. Such motor operates through a plurality of independently operated electromagnetic clutches which function to selectively couple either of the carrier conveying mechanisms or the carrier transport rotating means to the drive motor.

The invention and its various advantages will become more apparent to those skilled in the art from the ensuing detailed description of a preferred embodiment, reference being made to the accompanying drawings.

DETAILED DESCRIPTION OF PREFERRED EMBODIMENTS

Figure 1:
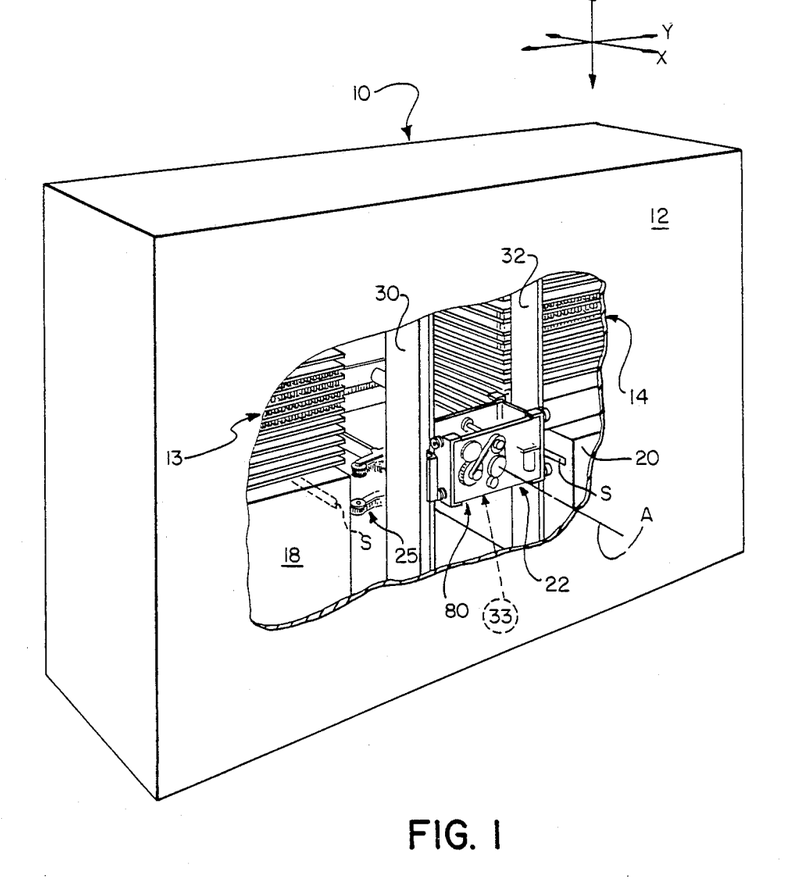
FIG. 1 is a perspective view of an automatic disk library embodying the invention.

Referring now to the drawings, FIG. 1 illustrates an automated disk library 10 embodying the various aspects of this invention. Such library comprises a housing 12 which contains (a) disk storing means 13, 14 for storing a relatively large number of data storage disk assemblies 15 in spaced, vertical columns; (b) a pair of disk drives 18, 20, for recording and/or playing back information on the data storage disks, one of such drives being located directly above or below the disks defining each of such columns; and (c) a disk transport mechanism 22 for transporting disks between the disk storing means and the disk drives. Each of the disk storing means preferably comprises a rack 16 which supports, in a conventional manner, a stack of generally planar disk assemblies (described below) in closely spaced horizontal planes, one directly above the other. Disk storing means 13, 14 are arranged in confronting relationship on opposite sides of a vertical corridor C along which disk assemblies are transported between the storage and the disk drives. Each disk drive has an entrance slot S through which disk assemblies can enter the interior of the drive unit and be rotatably driven on a spindle or the like. The disk drives are arranged on opposite sides of the vertical corridor with their respective entrance slots facing each other. As explained below, each disk drive is adapted to receive and handle disk assemblies in any one of four different orientations, i.e., a given side facing upwardly or downwardly, and a given end being either the leading end or trailing end as it enters a disk drive. Suitable disk drives are disclosed in the commonly assigned U.S. Patent Application Ser. No. 923,508, filed on Oct. 27, 1986, in the names of D. Petruchik et al.

Disk transport mechanism 22 comprises a bi-directional disk picker assembly 25 which is supported for rotation about an axis A by a drive unit 80, both being described in detail below. Drive unit 80 is mounted for vertical movement along a pair of vertical rails 30, 32 and is driven therealong by a motor 33. During vertical movement of the drive unit, the disk picker assembly is transported up and down the vertical corridor between the disk storing means and disk drives. The disk picker assembly is adapted to extract disk assemblies from either disk storing means (or from either disk drive) by moving such assemblies along the Y axis and into the center of corridor C. Having extracted a disk from storage, the picker assembly is vertically advanced (downward, as shown in FIG. 1) so as to locate the "picked" disk assembly in a position in which the picker assembly can be again operated to advance the disk assembly into a selected disk drive.

Figure 2:
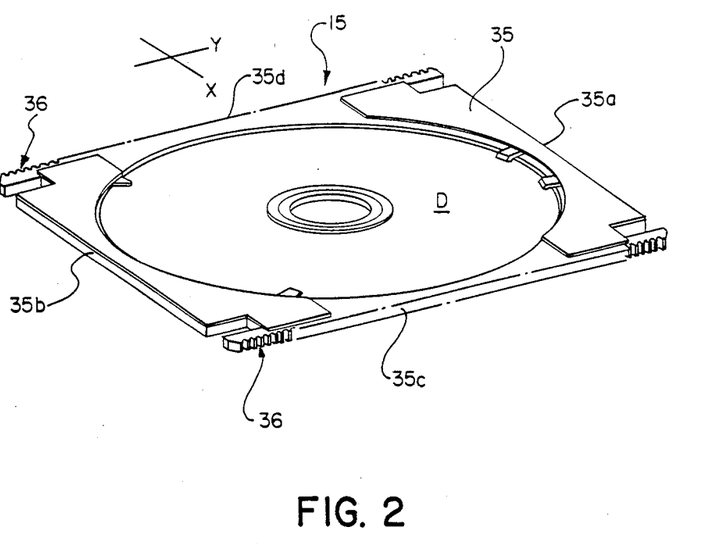
FIG. 2 is a perspective view of a rigid optical disk assembly of the type used in the FIG. 1 apparatus.

As shown in FIG. 2, each disk assembly basically comprises a data storage disk D which is releasably captured within a circular aperture defined by a disk carrier 35. The disk carrier comprises a generally rectangular frame having front and rear edges 35a, 35b, and a pair of lateral edges 35c, 35d. Each of the lateral edges of the disk carrier is provided with a rack of teeth 36 which extends the entire length of such edge. Such racks of teeth, as explained below, are acted upon by the disk picker assembly to move a disk assembly into and out of storage, or into and out of the disk drives. It will be noted that the toothed structure on the carrier is symmetrically arranged with respect to both the X and Y axes. Accordingly, such structure can be engaged by the picker assembly no matter which end of the carrier is more accessible, or which side of the assembly is facing upwardly. Thus, in contrast with prior art systems, a disk assembly can be stored on either side of corridor C and with either side facing upwardly. After a disk is extracted from the disk drive, it can be stored in the first empty storage position it encounters, on either side of the vertical corridor, during its return trip to storage. This has the advantageous effect of minimizing the mean time for exchanging disks. The disk carrier shown in FIG. 2 is the subject of the commonly assigned U.S. Patent Application Ser. No. 019,854, filed concurrently herewith in the names of W. P. Carlson and L. W. Wirth.

Figure 3:
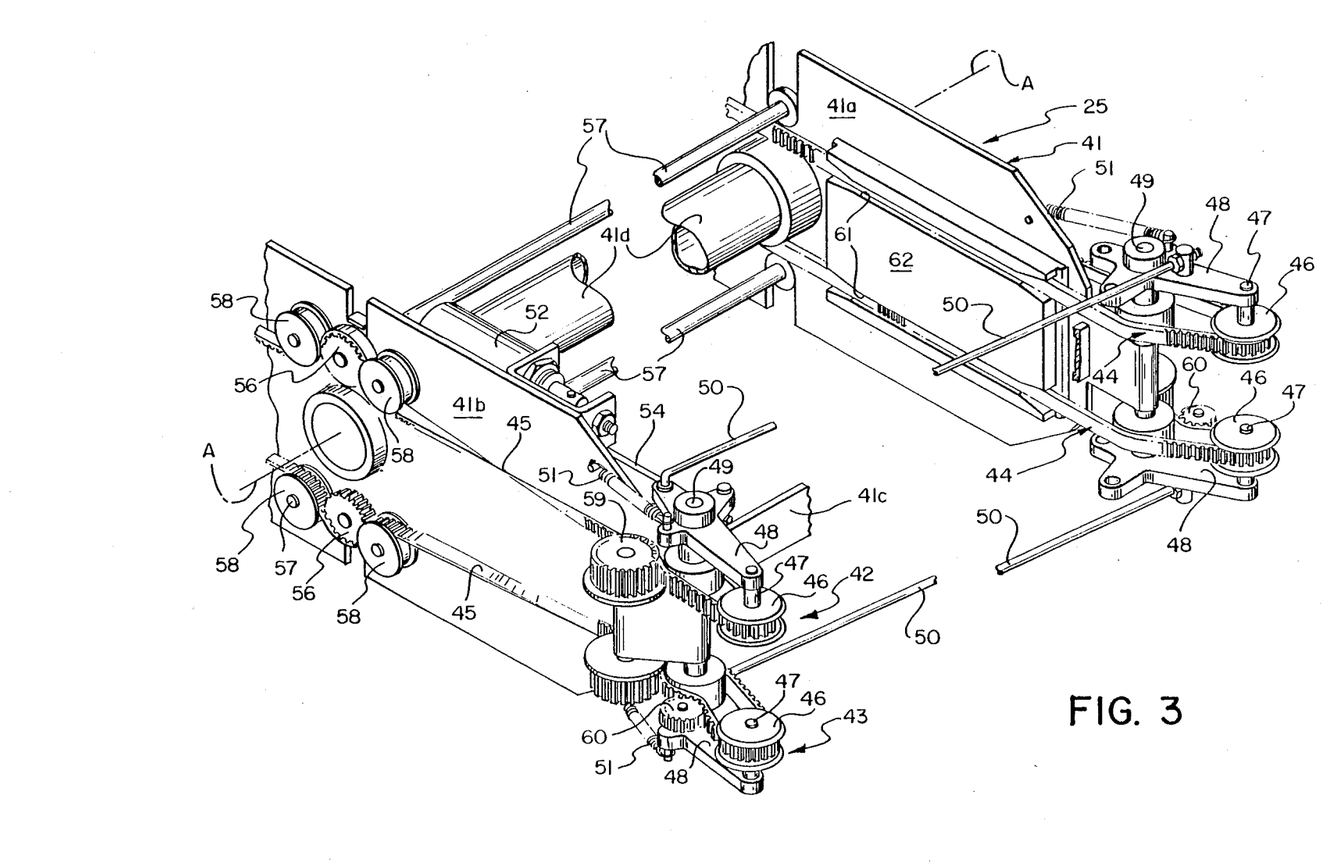
FIG. 3 is a partial perspective view of a disk picker and transport mechanism for transporting disk carriers within the apparatus shown in FIG. 1.
Figure 4A:
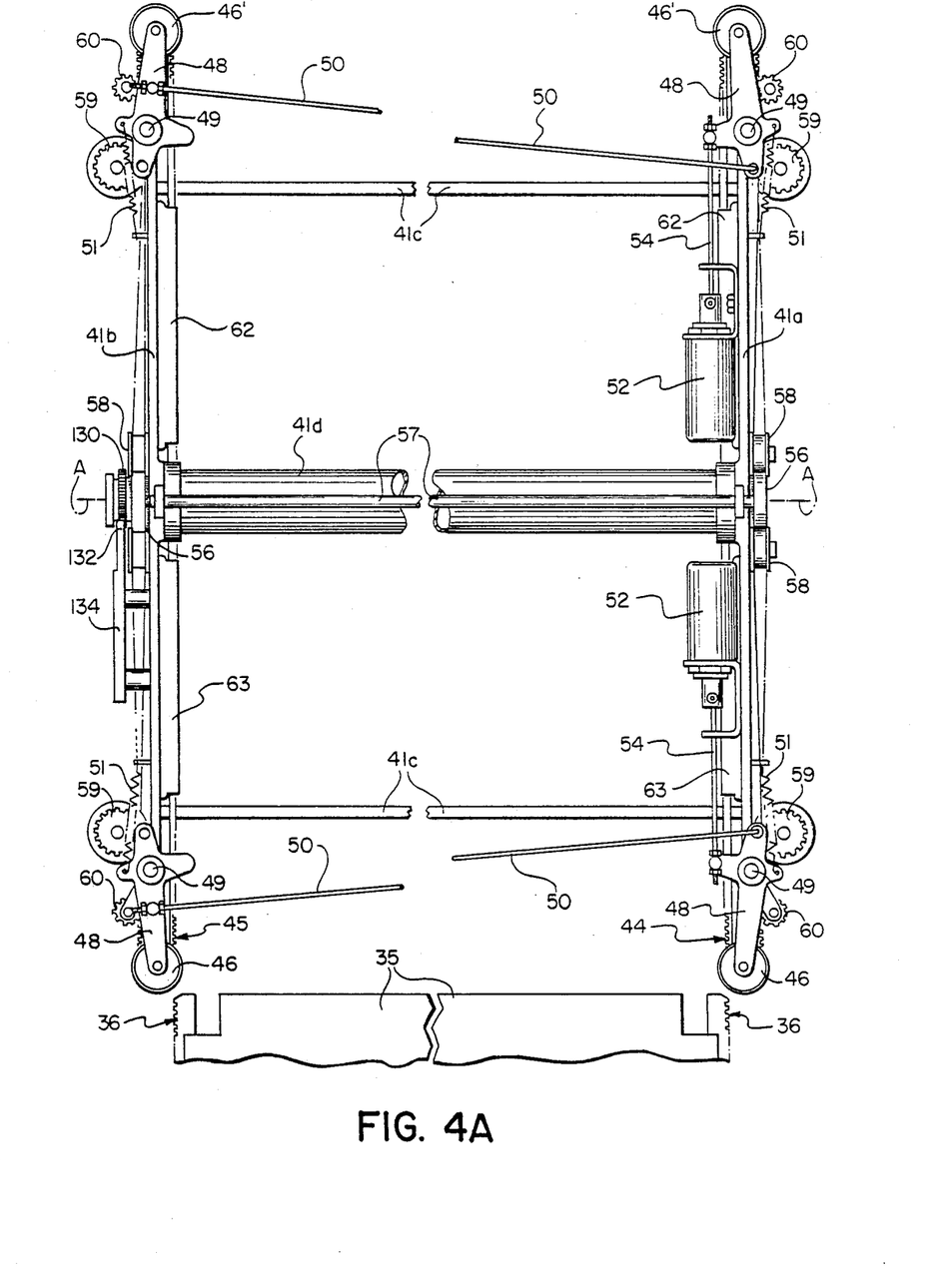
FIGS. 4A and 4B are top plan and side elevational views of the FIG. 3 mechanism.
Figure 4B:
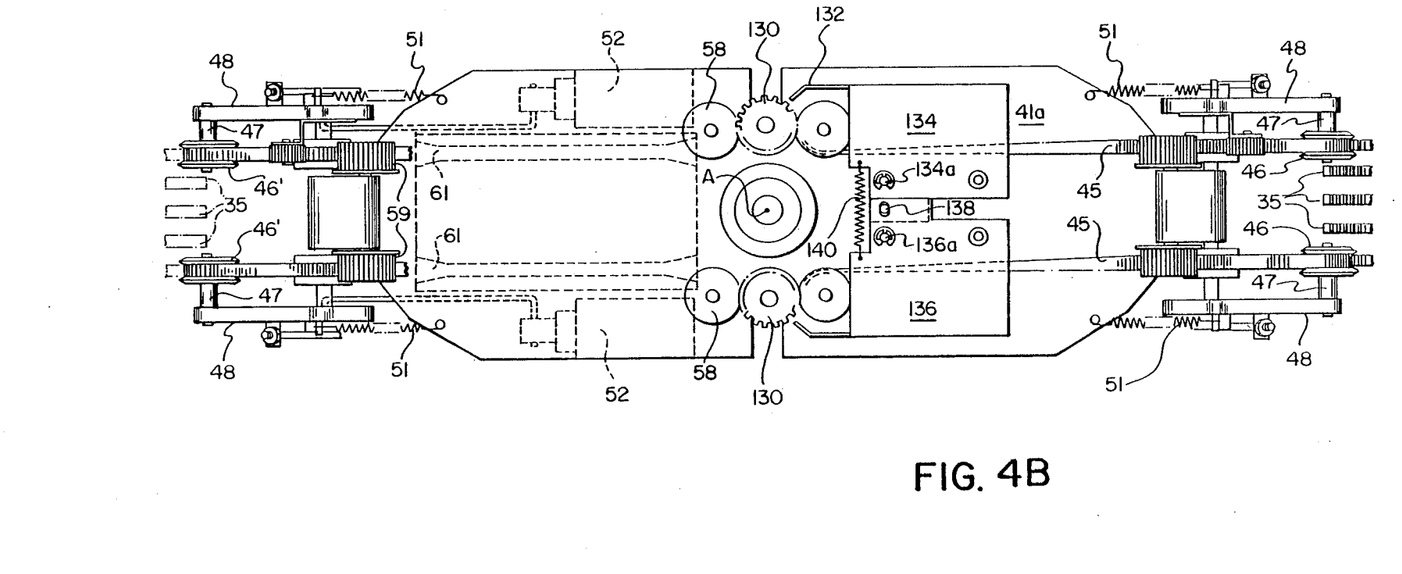

Referring to FIGS. 3, 4A and 4B, the disk picker assembly 25 is shown to comprise a frame 41 which supports two independently operable, bi-directional disk carrier conveyor mechanisms, 42, 43, one being located directly above the other. Each carrier conveyor mechanism, as explained below, is adapted to extract a disk from either disk storing means (or disk drive) and to convey such disk along the system's Y axis (see FIG. 1) to the center of corridor C. On command, each conveyor will return an extracted disk to either storage means or disk drive. Two conveyor mechanisms provide for a fast disk exchange, since one conveyor can be standing by with the next disk to be loaded into the disk drive while the other conveyor mechanism extracts a disk from the disk drive. The picker assembly need only index vertically the spacing between the two conveyor mechanisms, about 5 centimeters.

Each disk conveyor mechanism 42, 43 comprises a pair of spaced endless conveyor belts 44, 45, each belt being trained about a pair of spaced flanged rollers 46, 46' which are rotatably supported at opposite ends of the picker frame 41. As best shown in FIGS. 3 and 4A, frame 41 is generally rectangular in shape, comprising a pair of sidewalls 41a, 41b connected at their respective ends by struts 41c and at their respective centers by a central axle 41d. Each of the flanged rollers 46 is journalled for rotation about a pin 47 supported by a "t"-shaped arm 48 which, in turn, is pivotally mounted on a pin 49 supported by the frame sidewalls. Adjustable tierods 50, serve to couple opposing pivotal arms so that, as one arm pivots, the opposite arm pivots an equal amount and in an opposite direction. As is apparent, as opposing pivotal arms move toward each other, the spacing between their supported flanged rollers 46 is reduced. Springs 51 serve to bias the opposing and coupled pivotal arms to an "open" position in which their associated flanged rollers are spaced relatively far apart. A solenoid 52 serves to control the relative position of each opposing pair of pivot arms. When activated, the solenoid plunger 53 is withdrawn, as shown in FIG. 4A, and, via tierods 50 and 54, the pivot arms are moved to a "closed" position in which the flanged rollers are spaced relatively close together. When opposing pivot arms are in a closed position, their associated conveyor belts will engage the opposing racks of teeth on a selected cartridge.

Each of the conveyor belts 44 and 45 has a toothed structure which is adapted to engage and mesh with the rack of teeth supported by the opposing lateral edges of the disk carriers. The carrier conveyor belts are driven by gears 56 mounted on drive shafts 57. Each drive shaft is rotatably supported by the frame walls 41a and 41b and are selectively driven in either clockwise or counterclockwise directions by a bi-directional drive unit, described below. As best shown in FIG. 3, each conveyor belt is guided along its endless path by a pair of flanged rollers 58 arranged on opposite sides of the drive gears 56, each roller 58 being rotatably supported by the picker frame walls. In order to orient each belt so that it may engage the carrier racks 36, a quarter-twist (90°) is provided in each belt between rollers 58 and a toothed idler roll 59 which is rotatably supported by the picker frame in the vicinity of the picker arms. Tension in each belt is controlled by the position of a small toothed roller 60 which is rotatably mounted on one of the two pivot arms which serves to support each conveyor belt. In the interior of the picker frame, the conveyor belts are guided by slots 61 formed in each of a pair of pads 62, 63 supported by the frame walls. (See FIG. 3.) Opposing pads supported by the frame walls are spaced such that a disk carrier will be supported by their associated slots during transport by the conveyor belts.

Disk picker assembly 40 is dimensioned so that its length, as measured between flanged rollers 46 and 47, is somewhat longer than the length of a disk carrier (as measured between its front and rear edges), and its width, as measured between the bottom surfaces of opposing slots 61 is slightly greater than the width of a disk carrier. As shown in FIG. 4B, the confronting disk storing means 14, 16 are arranged so that the conveyor belts of the picker assembly can engage disk carriers on either side of the vertical corridor C. When one of the four solenoids 52 is actuated, a pair of opposing rollers 46 (operatively associated with such solenoid) will move to a closed position in which the teeth of the conveyor belt supported thereby engage the outermost ends of the opposing racks 36 of a selected disk carrier. When the appropriate drive shaft 57 is rotated, the conveyor belts which are driven thereby act upon the disk carrier to withdraw the carrier into the central region of the picker assembly, at which point the disk carrier is supported by opposing slots 61 in pads 62. To properly orient the disk so that a desired side will be presented to the disk drive, the picker assembly is mounted for rotational movement about axis A. Means for providing such rotational movement is described below.

Figure 5:
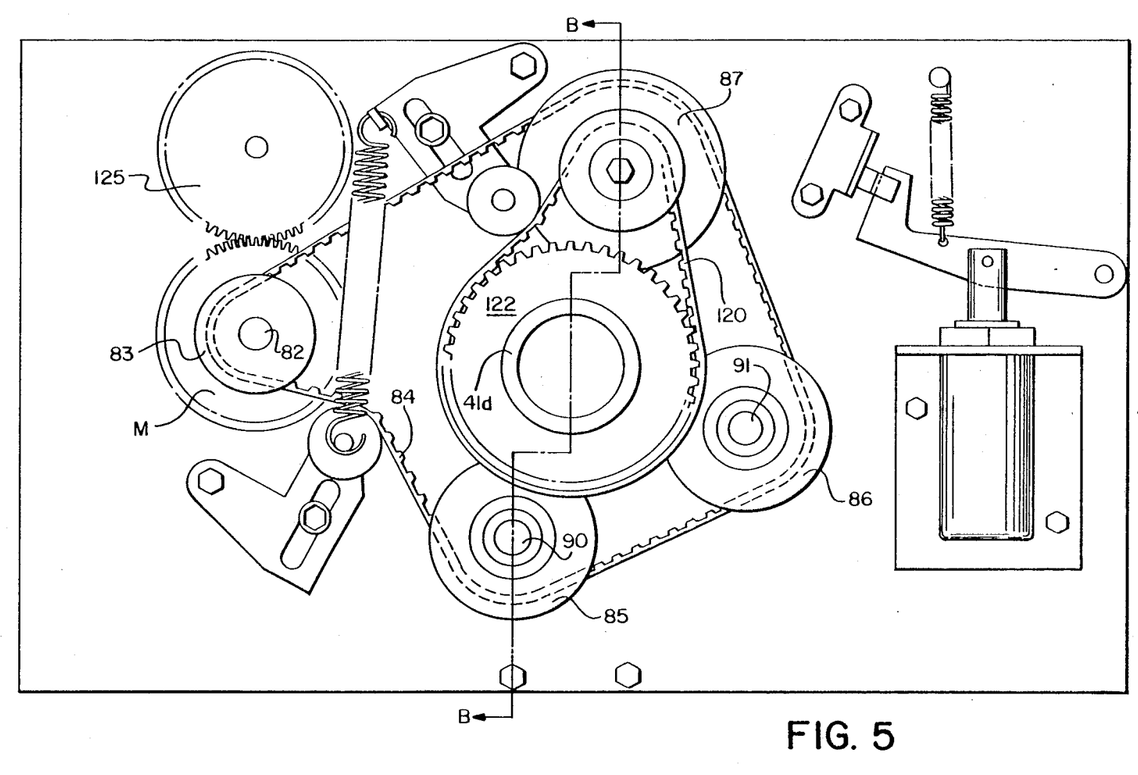
FIGS. 5 and 6 are front and top elevations, respectively, of a drive unit for operating the FIG. 3 mechanism.
Figure 6:
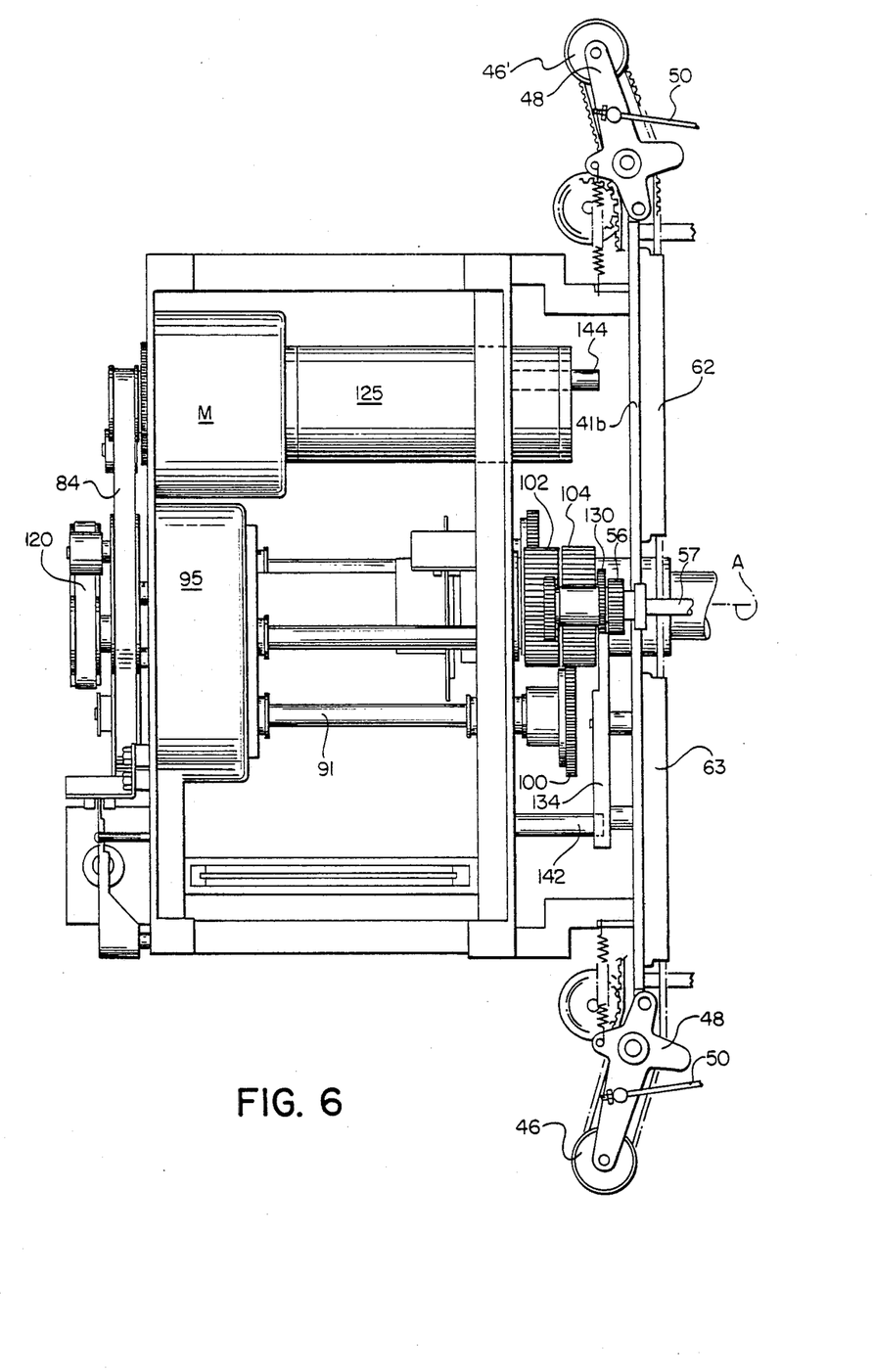
Figure 7:
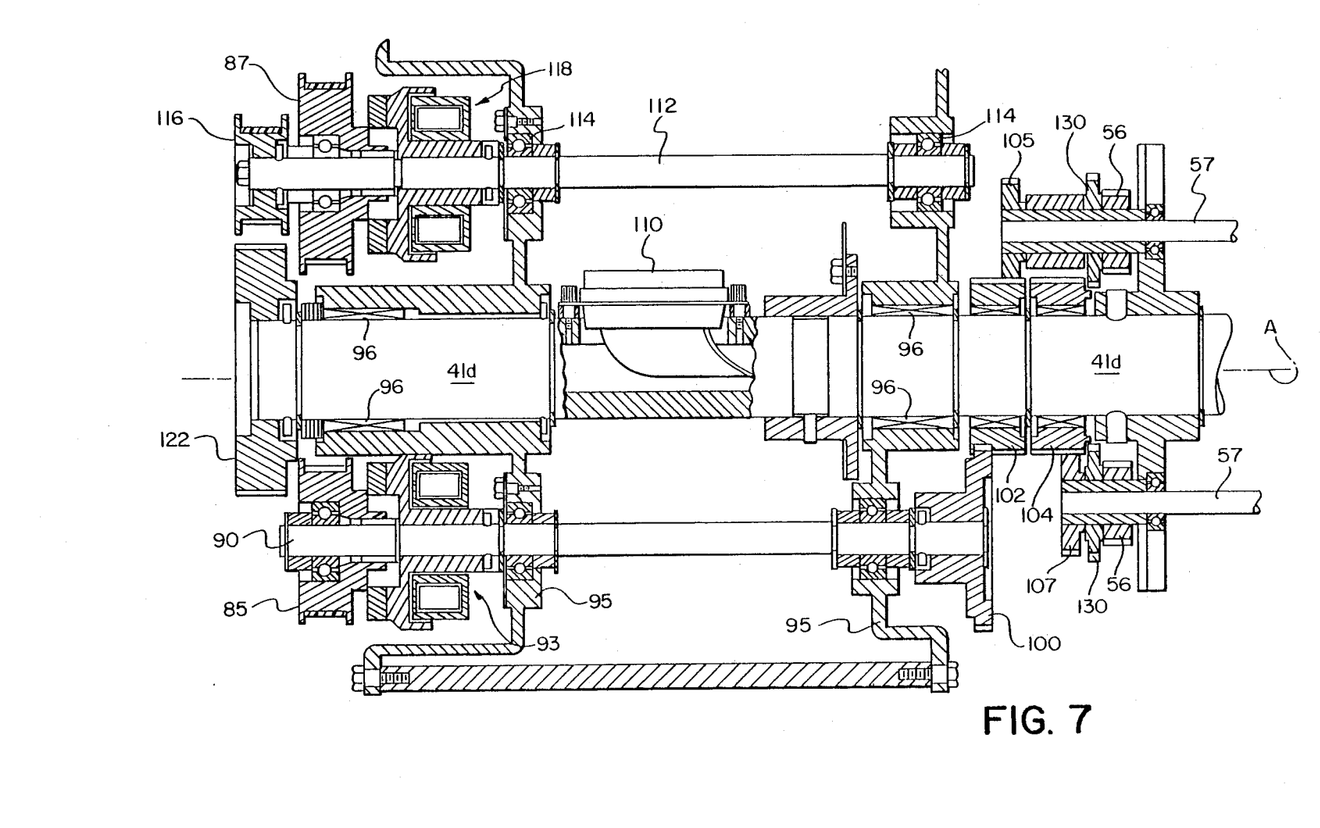
FIG. 7 is a cross-sectional view taken along the section line B—B in FIG. 5.

The drive unit 80 for selectively driving the carrier-conveying mechanisms 42 and 43 of the picker assembly 25 and for selectively rotating the picker assembly about axis A is best shown in FIGS. 5-7. The drive unit comprises a conventional bi-directional DC servo motor M having a drive shaft 82 with a flanged toothed pulley 83 mounted thereon. As the motor shaft rotates, it advances a toothed timing belt 84 along an endless path defined by three toothed pulleys 85, 86 and 87. Pulleys 85 and 86 are supported for rotation on shafts 90 and 91, respectively. Shafts 90 and 91 also support electromagnetic clutches 93 and 94, respectively. When actuated, each clutch couples the rotational movement of the driven pulley (85 or 86) to its associated shaft, causing such shaft to rotate in sleeve bearings supported by the drive unit frame 95. The drive unit frame 95 also rotatably supports, in bearings 96, an extended portion of the picker assembly's axle 41d. Each of the shafts 90 and 91 has a gear 100 (only one being shown) mounted thereon which rotates when its associated shaft is rotated by the clutch-coupling to the drive motor. Each of the gears 100 acts to drive one of two sun gears 102, 104 mounted for rotation on the picker assembly axle. When sun gear 102 is rotatably driven, it acts to drive a gear 105 mounted on the end of one of the picker assembly drive shafts 57. Similarly, when sun gear 104 is rotatably driven, it acts to rotate a gear 107 mounted on the end of the other drive shaft 57 of the picker assembly.

From the foregoing, it will be appreciated that drive motor M can selectively rotate either of the drive shafts 57 of the picker assembly (by energizing the appropriate electromagnetic clutch) and, in so doing, advance either the upper or lower pair of carrier conveyor belts 44, 45. Since motor M is bi-directional, it is apparent that the conveyor belts can be selectively driven in either direction, for example, to advance disk carriers into or out of storage. After a carrier has been advanced to the center of the picker assembly, photoelectric sensors (not shown) detect this condition and decouple the drive motor from the picker drive shafts by inactivating the appropriate electromagnetic clutch. Electric power for the picker solenoids and the photoelectric sensors for the carrier can be advantageously routed through the center of the picker axle using a suitable connector 110.

As mentioned above, the picker assembly is rotatably supported on the drive unit frame by means of bearings 96 which rotatably support the picker assembly axle. Rotational movement of the picker axle is controlled by the aforementioned pulley 87 which is continuously driven whenever the drive motor M is activated. Pulley 87 is journalled for rotation on a shaft 112 which is rotatably supported on the drive unit frame by bearings 114. Pinned to one end of shaft 112 is a flanged toothed pulley 116 which, in the manner described below, controls the rotational movement of the picker axle. An electromagnetic clutch 118 is supported by shaft 112. When energized, clutch 118 couples the rotational movement of pulley 87 to the shaft 112, causing pulley 116 to rotate. As pulley 116 rotates, it drives a toothed timing belt 120 which, in turn, drives a toothed pulley 122 which is pinned to one end of the picker axle. The amount of rotational movement of the picker axle and the distance travelled by the picker conveyor belts 44 and 45 is monitored by an encoder 125 which is, as shown, operatively coupled to the drive motor.

From the above description, it will be appreciated that the entire operation of the picker assembly is controlled by a single DC servo motor which controls the rotation of three drive shafts through three independently operated clutches.

It may be appreciated that, by virtue of the picker assembly rotating 180° about axis A, as described, there is a possibility that a disk carrier will fall from the picker assembly as the plane of the picker approaches a vertical orientation. Note, when the electromagnetic clutches 93 and 94 are deactivated, picker driver shafts 57 are free-wheeling. To prevent this occurrence, a conveyor braking system is provided which automatically operates whenever the picker assembly is rotated a few degrees from its normal horizontal orientation. Such braking system is best shown in FIGS. 4B, 6 and 7 and comprises a pair of cog wheels 130, one mounted on each picker drive shaft 57 (adjacent belt drive gears 56) and a pair of pawls 132 which engages the cog wheels and prevent rotation of drive shafts 57 whenever the picker assembly moves from its horizontal position. Referring to FIG. 4B, pawls 132 are shown to be supported by a pair of rectangular members 134 and 136, each being pivotally mounted to the picker frame wall 41b which is closer to the drive unit frame 95. Member 134 is pivotally supported on a pivot pin 134a, and member 136 is pivotally supported on a pivot pin 136a. Members 134 and 136 are loosely coupled by a coupling pin 138 and a spring 140, connected between members 134 and 136 serves to normally urge pawls 132 into engagement with the cog wheel 130. Note, in FIG. 4B, the cog wheels are not shown. Only when the picker assembly is in a horizontal position are pawls 132 disengaged from the cog wheels 130 allowing the picker drive shafts 57 to be rotatably driven by motor M. To free the braking pawls from the cog wheels, a pin 142 is positioned on the drive unit frame to engage one member 136 as the picker assembly returns to its horizontal position. In doing so, pin 142 pivots member 136 in a counterclockwise direction about its pivot pin 136a. Such movement causes the bottom pawl 132 (as viewed in FIG. 4B) to move against the spring force to a disengaging position, as shown. Movement of the upper member 134 to a similar position is effected by the coupling pin 138. Note as member 136 pivots counterclockwise, coupling pin 138 moves to the left, thereby causing upper member to pivot clockwise to its unlocking position. A second unlocking pin 144 (shown in FIG. 6) is provided on frame 95 and located to similarly engage member 134 when the picker assembly is rotated 180° counterclockwise about axis A. Latching means (not shown) are provided for latching the picker assembly in one or the other of its horizontal positions. Release of the latch is controlled by a solenoid 150.

From the foregoing, it will be appreciated that an exceptionally versatile and high speed disk library has been disclosed. It is versatile in that it is capable of storing disk assemblies on either side of the vertical corridor C, allowing disks to be unloaded at the first available empty position in the storage rack. Protocols can be established to position the most frequently used disks at locations in storage which are relatively close to the disk drive, thereby minimizing disk changing time. The versatility is made possible not only by the design of the disk carriers which enable handling in any one of the four aforementioned orientations, but also by virtue of the fact that the disk picker assembly is rotatable about an axis extending perpendicular to the direction in which the picker assembly conveys disks to and from storage. In prior art systems, the picker mechanisms have been designed to rotate about an axis which is parallel to the direction in which the picker extracts disks from storage. In such systems the disk assemblies must always be stored on a predetermined side of the corridor along which the disks are conveyed between the storage and utilization devices. Mechanisms for vertically advancing the picker assembly along the corridor are well known and, accordingly, are discussed herein.

The invention has been described in detail with particular reference to preferred embodiments thereof, but it will be understood that variations and modifications can be effected within the spirit and scope of the invention.

We claim:

1. An automated library for data storage disks, said library comprising:
    (a) a housing;
    (b) storage means supported by said housing for storing a plurality of data storage disks side-by-side in closely spaced parallel planes, each of such disks being supported in a generally rectangular disk carrier having a pair of spaced, parallel edges along which racks of teeth are disposed;
    (c) a disk utilization device supported by said housing;
    (d) a disk picker assembly operable in a first mode to engage a selected disk carrier in said storage means and to extract such disk carrier from said storage means by moving such disk carrier along a linear path, said disk picker assembly comprising a first bi-directional disk carrier conveyor mechanism including a pair of movably mounted toothed conveyor members adapted to cooperate with the racks of teeth of a selected carrier for moving such carrier along said linear path, means for selectively moving said conveyor members into engagement with said racks of teeth, and means for advancing said conveyor members along endless paths to advance a disk carrier along said linear path;
    (e) support means for rotatably supporting said picker assembly for movement about an axis extending perpendicular to said linear path and in a plane parallel to said spaced parallel planes;
    (f) drive means for selectively rotating said picker assembly 180° about said axis; and
    (g) means for movably mounting said support means on said frame for movement in a direction perpendicular to said linear path and to said axis of rotation to present an extracted disk carrier to said disk utilization device.

2. The invention as defined by claim 1 wherein said picker assembly comprises a second bi-directional disk carrier conveyor mechanism, said second conveyor mechanism being substantially identical in structure to said first conveyor mechanism, said first and second conveyor mechanisms being independently operable.

3. The invention as defined by claim 2 wherein said first and second disk carrier conveyor mechanisms are adapted to support two disk carriers in spaced, parallel planes, the spacing between such supported carriers being equal to the closest spacing between adjacent carriers when stored in said storage means.

4. The invention as defined by claim 1 wherein said toothed conveyor members comprises toothed conveyor belts.

5. The invention as defined by claim 4 wherein said disk picker assembly comprises a generally rectangular frame which rotatably supports two sets of rollers, each set of rollers defining a transport path for one of said conveyor belts, and wherein said means for selectively moving said conveyor members comprises means for adjusting the respective positions of at least some of said rollers relative to said frame.

6. In an automated library for storing and using a plurality of data storage disks, each of such disks being supported by a disk carrier having spaced, parallel edges, said library comprising: first and second disk-storing means, each being adapted to store a plurality of data storage disks and their supporting disk carriers in closely spaced parallel planes, said first and second disk-storing means being spaced apart to define therebetween a disk-transport corridor; and disk utilization means positioned along said corridor; the improvement comprising:

disk transport means for transporting selected disks along said corridor between said first and second disk-storing means and said utilization means, said disk transport means comprising: (i) a disk picker assembly for moving selected disk carriers along a linear path between either of said disk-storing means said corridor, said disk picker assembly comprising a pair of juxtaposed, independently operable, bi-directional disk carrier conveyor mechanisms, each of said mechanisms comprising endless, movably mounted, conveyor members having racks of teeth adapted to cooperate with similar racks of teeth associated with the spaced parallel edges of the disk carriers, and a bi-directional drive means for selectively advancing said conveyor members along endless paths to simultaneously convey a pair of disk carriers between said storing means and said corridor; (ii) means for advancing said disk picker assembly along said corridor to advance such pair of disk carriers between said disk-storing means and said utilization means, and (iii) means for selectively rotating said picker assembly 180° about an axis extending perpendicular to said predetermined path so that both sides of either of a pair of data storage disks can be presented to said disk utilization means.

7. The invention as defined in claim 6 wherein each of said carrier conveyor members comprises a toothed conveyor belt, and wherein said carrier conveyor mechanisms comprise means for selectively moving said belts into engagement with the disk carrier edges.

8. The invention as defined by claim 6 wherein said independently operable disk carrier conveyor mechanisms are adapted to extract disk carriers from and return disk carriers to either of said disk-storing means.

9. The invention as defined by claim 6 wherein said disk transport means comprises a single, bi-directional drive motor having a drive shaft, and means for selectively coupling said drive shaft to said picker assembly rotating means and to said endless conveyor members of said carrier conveyor mechanisms to respectively control the orientation of said picker assembly about said axis and the movement of said endless conveyor members along said endless paths.

* * * * *